United States Patent
Gottschalk

(10) Patent No.: US 6,508,692 B2
(45) Date of Patent: Jan. 21, 2003

(54) CNC MACHINE TOOLS

(75) Inventor: Charles E. Gottschalk, Whitehouse, OH (US)

(73) Assignee: Glassline Corporation, Perrysburg, OH (US)

( * ) Notice: Subject to any disclaimer, the term of this patent is extended or adjusted under 35 U.S.C. 154(b) by 86 days.

(21) Appl. No.: 09/850,645

(22) Filed: May 7, 2001

(65) Prior Publication Data

US 2001/0018312 A1 Aug. 30, 2001

Related U.S. Application Data

(62) Division of application No. 09/448,117, filed on Nov. 24, 1999.

(51) Int. Cl.$^7$ .............................................. B24B 49/00
(52) U.S. Cl. .............................. 451/5; 451/11; 451/43; 451/44
(58) Field of Search ................................ 451/5–11, 43, 451/44, 412, 9

(56) References Cited

U.S. PATENT DOCUMENTS

| | | |
|---|---|---|
| 5,012,069 A | 4/1991 | Arai |
| 5,216,222 A | 6/1993 | Masuda |
| 5,371,974 A | 12/1994 | Lecerf et al. |
| 5,562,527 A | 10/1996 | Nauche |
| 5,588,899 A | 12/1996 | Gottschald |
| 5,718,832 A | 2/1998 | Mori |
| 5,829,928 A * | 11/1998 | Harmand et al. ............... 451/5 |
| 5,852,276 A | 12/1998 | Yamazaki et al. |
| 5,893,987 A | 4/1999 | Yamazaki et al. |
| 5,956,253 A | 9/1999 | Gottschalk |
| 6,298,278 B1 * | 10/2001 | Pierse ............................. 451/8 |
| 6,325,697 B1 * | 12/2001 | Gottschalk ...................... 451/5 |

\* cited by examiner

Primary Examiner—Lee Wilson
(74) Attorney, Agent, or Firm—Emch, Schaffer, Schaub & Porcello Co., L.P.A.

(57) ABSTRACT

This device is a computer numerically controlled (CNC) machine tool such as an edge grinding apparatus. More specifically, the device is a CNC apparatus for processing blanks such as a glass sheet. The device uses a sensor to program the path of the grinding wheel. The device analyzes the position of all like-workpieces placed in the machine and creates offset parameters to accurately process each workpiece in accordance with the initial preprogrammed path.

7 Claims, 6 Drawing Sheets

CNC MACHINE TOOLS

This is a division of application Ser. No. 09/448,117 filed Nov. 24, 1999.

TECHNICAL FIELD

This apparatus relates to computer numerically controlled (CNC) machine tools such as an edge grinding apparatus. More specifically, the invention relates to a CNC apparatus which uses a sensor such as a laser for processing blanks such as a glass sheet.

BACKGROUND ART

Machine tools such as an edge grinding apparatus include at least one grinding wheel, at least one rotatable holder for a blank, and at least one CNC device for controlling the grinding of the blank according to selected specification. The CNC machine tool may include a multi-axis, linear (X, Y axis) holder instead of a rotatable holder. In either case, a cutting tool moves relative to the blank or workpiece under the control of a programmable controller, including a computer program.

In a standard CNC glass grinding machine, an operator must adjust the CNC parameters to allow the CNC machine to grind the part where it is located on the machine. This can be a slow process and is difficult for many operators to master. The prior art process requires the operator to grind a part, check the part for even grind then adjust the X, Y and rotation offset parameters on the CNC control to move the CNC program to match the part location.

U.S. Pat. No. 5,588,899 discloses one solution to this problem. The apparatus of this patent is an opto-electronic device for positioning eye glass or spectacle lenses in a CNC grinding device. The opto-electronic detecting device includes a CCD (charge coupled device) camera, a first control unit that includes an electronic picture processing and evaluating system cooperating with a second control unit. The system requires the manufacturer of the lens blank to mark each blank. If the blanks are not pre-marked, a separate marking is necessary.

U.S. Pat. No. 5,956,253 discloses a more recent development which uses a video controlled CNC apparatus for processing blanks such as a glass sheet. The device uses a video camera and monitor to program the path of the grinding wheel. The system requires a CNC machine, video camera, a video monitor, a vision board and software to calculate the offset parameters.

DISCLOSURE OF INVENTION

The device of this invention uses a high accuracy sensor to locate and program the path of the grinding wheel rather than position the blank in the CNC grinding device. No pre-marking or separate processing steps are needed. The system requires a CNC machine, a high accuracy reflective sensor and software to calculate the offset parameters. An operator must initiate a load cycle. Once the part is loaded on the CNC machine, the operator must start the measurement cycle. The measurement cycle will move a sensor such as a laser along the program path, stop at each of the checkpoints, and find the edge of the glass. The system software will store the edge of the glass and report the position to the CNC control. The control will continue this cycle through all the checkpoints. When the part path is complete the control will calculate the required offsets. Thereafter, the system will process additional blanks automatically without repeated adjustments for each blank.

The sensor may be a through beam or reflective type beam. It also could be inferred, ultrasonic or laser beam. Reflective lasers may be the best choice because they have a very small beam diameter, not easily affected by water or dirt, reasonable cost, and can see most materials well. The laser does not require the software power of the camera system. Also, the laser operates with or without hard stops. The laser is especially useful with many different sized parts, irregular edges or spacially curved edges (rear view mirror). The glass or blank acts as a reflective surface for the laser.

BEST MODE OF CARRYING OUT INVENTION

The CNC machine tool and high accuracy sensor are standard items, but the use of the sensor to control the path of the cutting tool in CNC machine tools is new. Software calculates the CNC offsets for the machine control. The sensor system finds the intersection of a minimum of two X plane and two Y plane programmed gridlines with the part perimeter. The CNC software must then calculate the real position of the intersections as compared to the positions in the sensor.

The software operation is as follows.

1. User initiates measurement of the part.
2. The control positions the sensor over the part.
3. The control searches for the edge of the part.
4. The control stores the position data.
5. The control calculates a new position to place the sensor.
6. The control positions the machine over the next point.
7. The control repeats steps 3 and 6 until the start point is reached.
8. The control initiates on optimize sequence to reduce the measured points to arcs and lines that can be used to control the machine in production.

Figure 1:
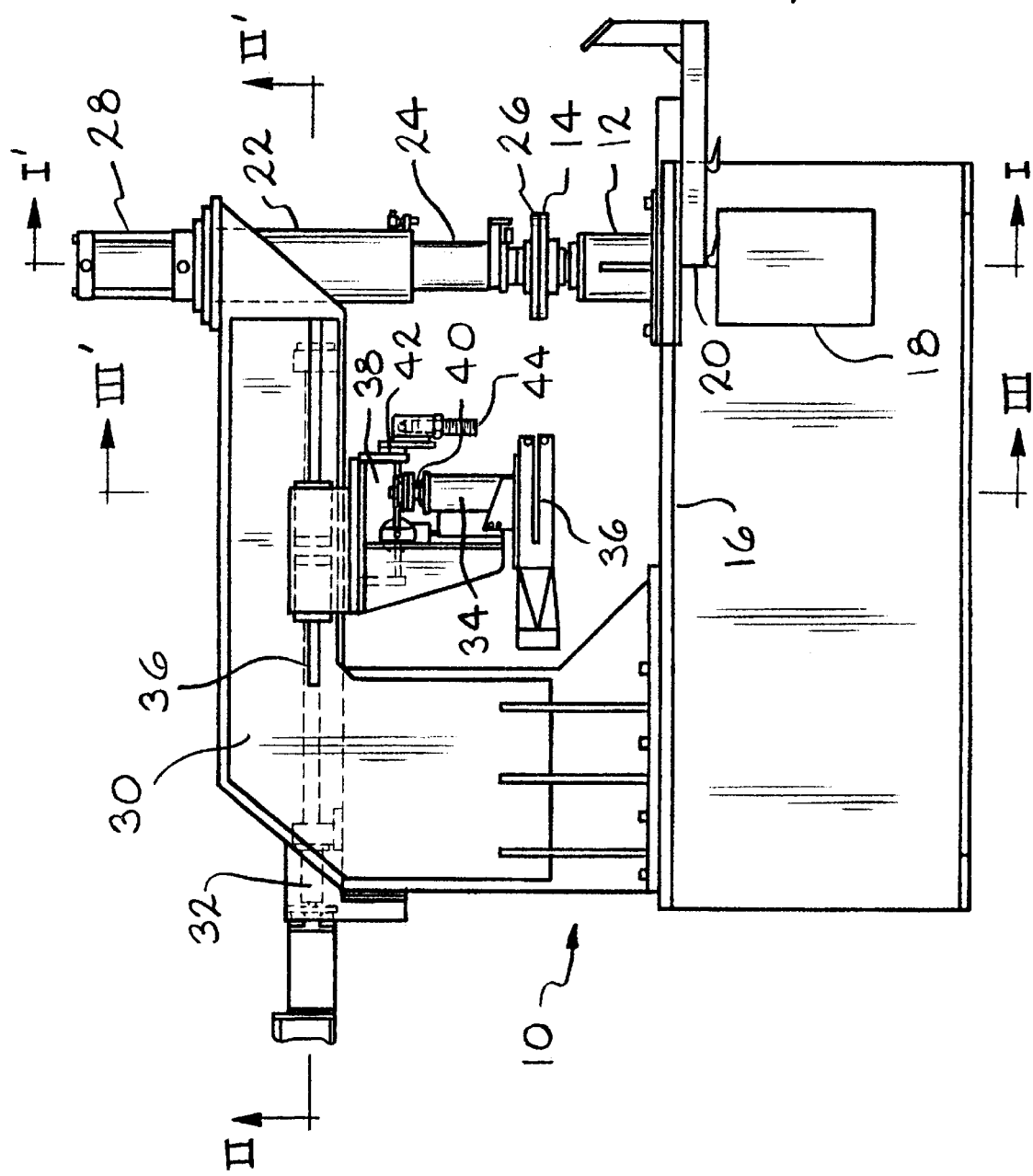
FIG. 1 is a side elevational view of an edge grinding apparatus according to the present invention having a rotatable holder.

FIG. 1 is a side elevational view of CNC edge grinding apparatus 10. Apparatus 10 subjects a generally planar article or blank S such as a sheet of glass to an edge grinding operation in an endless pattern around the periphery of the article. Blank S may have an irregular shape. Rotatable table 12 includes clamp 14. Frame 16 supports table 12, as well as the other components of CNC apparatus 10. Servo motor 18 drives or rotates table 12 through drive shaft 20 which connects motor 18 to table 12. Motor 18 rotates table 12 and blank S 360° about the I–I' axis. Lift cylinder 22 houses lift ram 24 which connects to clamp 26. Cylinder 28 raises and lowers ram 24 and clamp 26 in a vertical direction to predetermined set points along I–I' axis. Clamp 14 and clamp 26 sandwich blank S therebetween when cylinder 28 lowers clamp 26 to hold blank S in position against clamp 14.

Frame 16 also supports frame 30 and frame 30 in turn supports lift cylinder 22, servo motor 32 and edge grinder assembly 34. Servo motor 32 is connected to assembly 34 by drive shaft 36. Motor 32 moves assembly 34 horizontally on a straight line towards and away from blank S along the II–II' axis.

Edge grinder assembly 34 includes grinding wheel 36 and grinding motor 38. Motor 38 is rotatably connected to wheel 36 through drive shaft 40. Motor 38 rotates wheel 36 in a complete circle 360° about the III–III' axis.

Housing 42 surrounds motor 38. Housing 42 has an outside surface and laser 44 is attached to the outside surface of housing 42 with appropriate fasteners.

Figure 2:
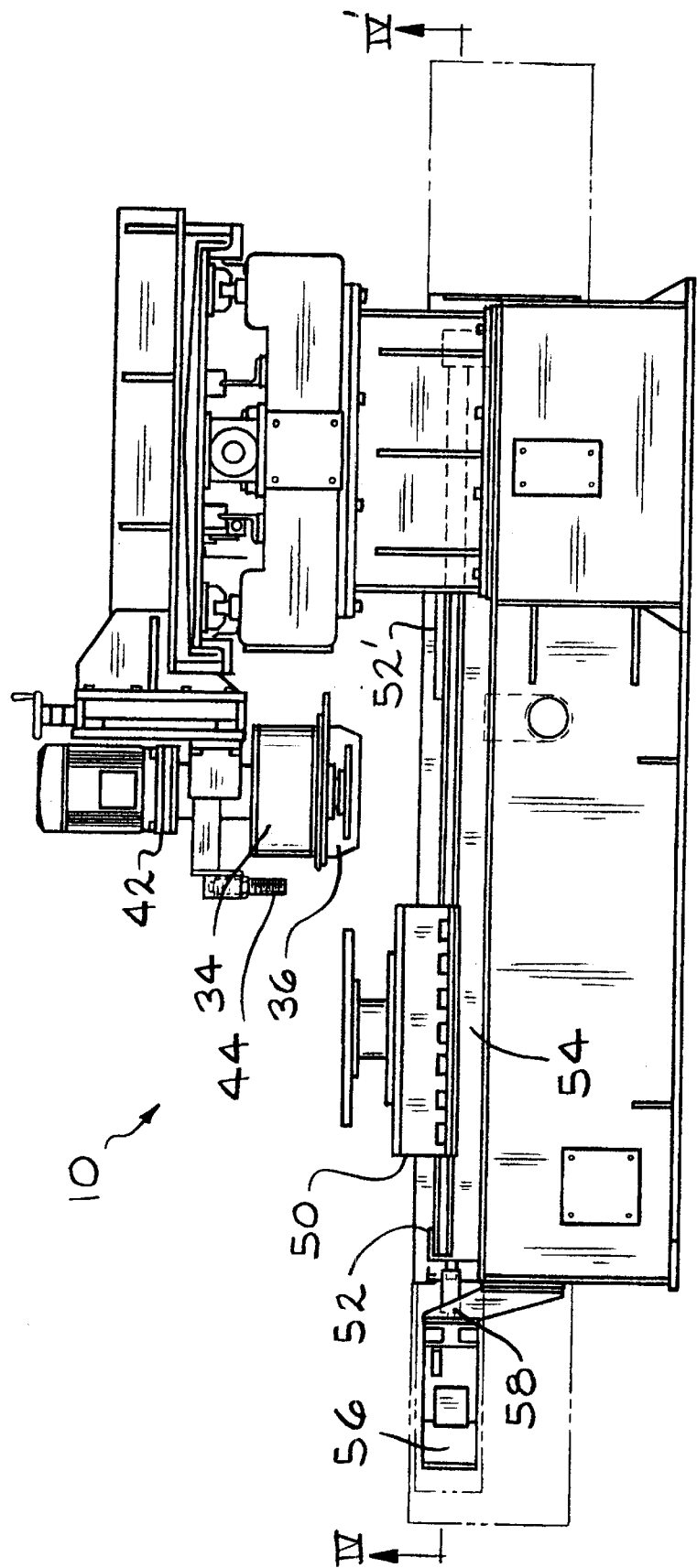
FIG. 2 is a side elevational view of an edge grinding apparatus according to the present invention having a multi axis, linear holder
Figure 3:
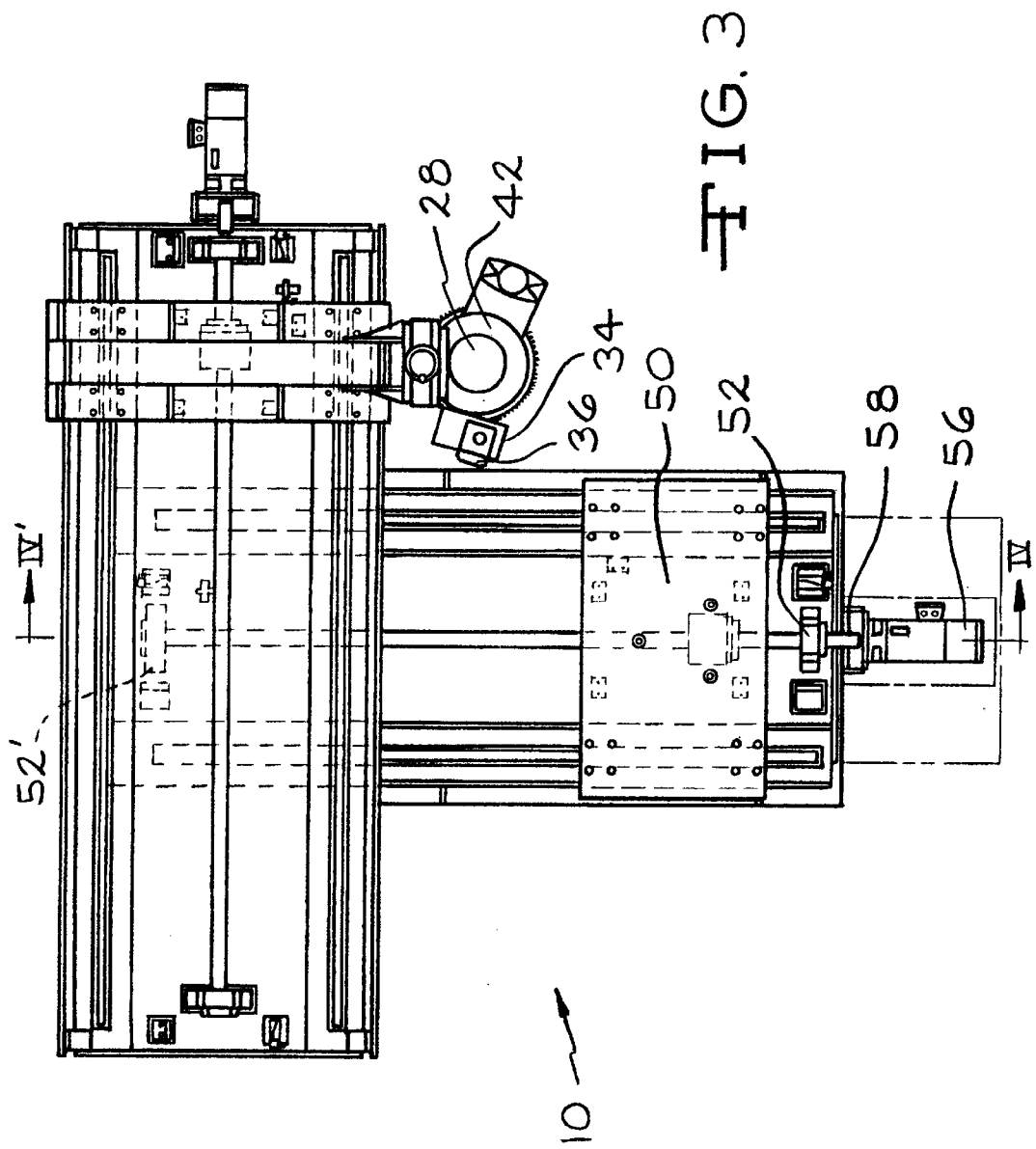
FIG. 3 is a top elevational view of the apparatus of FIG. 2.

FIGS. 2 and 3 shows CNC edge grinding apparatus 10 adapted for lateral, linear movement of a blank towards grinder assembly 34. Rotatable table 12 and its components are replaced with load table 50. Positive stops 52 and 52' are located on frame 54 which carries table 50. Motor 56 connects to table 50 through drive 58. Motor 56 moves table 50 back and forth horizontally in a straight line along IV–IV' axis between stops 52 and 52'.

Figure 4:
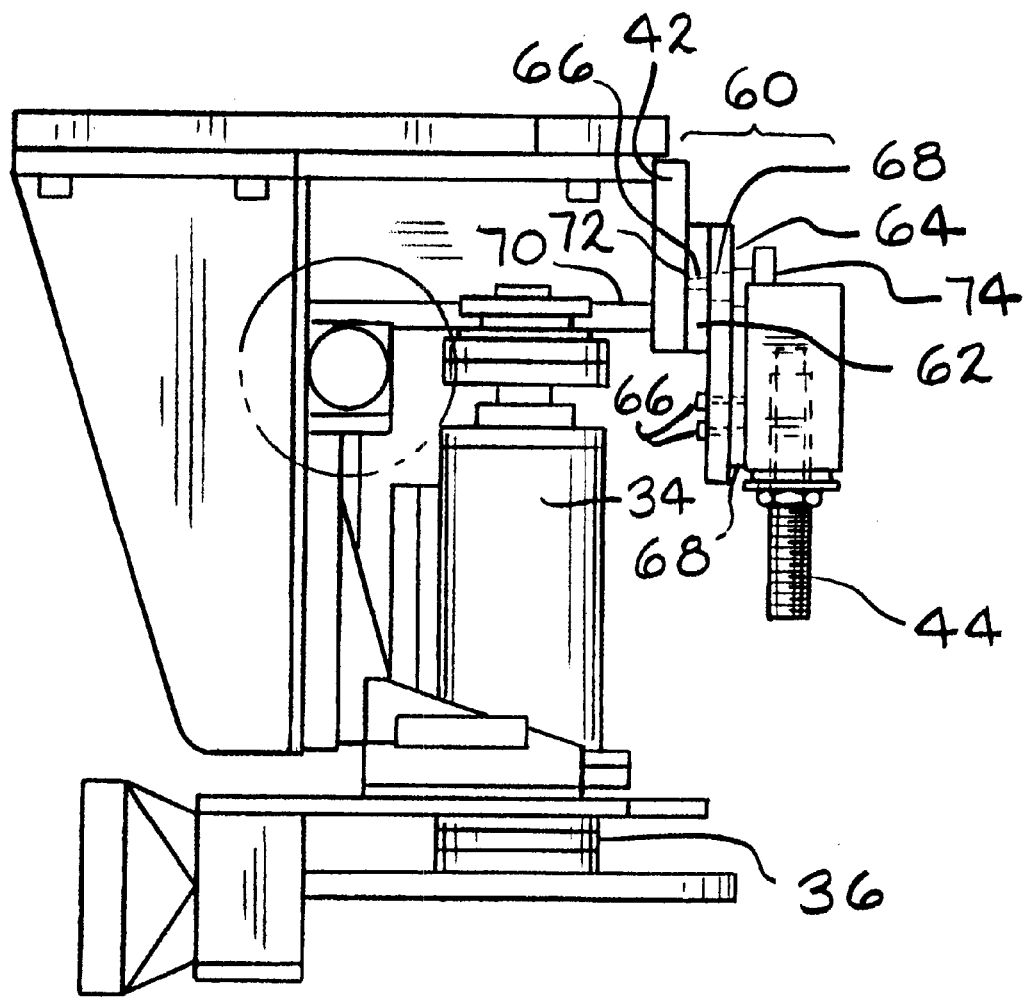
FIG. 4 is a fragmentary side view of FIG. 1 showing the video camera and fastener in greater detail.

FIG. 4 shows sensor 44 mounted on quick disconnect fastener 60. This keeps sensor 44 clean during production. Quick connect 60 uses two plates 62 and 64. One is mounted to sensor 44 and one to housing 42. Precision alignment pins 66 mounted to camera plate 62 and precision holes 68 in machine plate 64 make camera placement repeatable within +/−0.001" (0.025 mm). Machine plate 64 is slotted so the camera position can be adjusted during calibration. The center of sensor 44 may be aligned with +/−0.002" (0.05)mm of the center line of the spindle. The distance from the center of wheel 34 is measured within 0.001".

Sensor 44 is electrically disconnected with a connector 70 on cable 72 for the signal and power.

While the power of sensor (laser) 44 may vary widely, l prefer a lower power laser in the milliwatt range with a class 2 laser product safety rating. Generally, the laser has a power of less than 25 milliwatts and preferably less than 10 milliwatts. The laser 1 used was less than 1 milliwatt.

Figure 5:
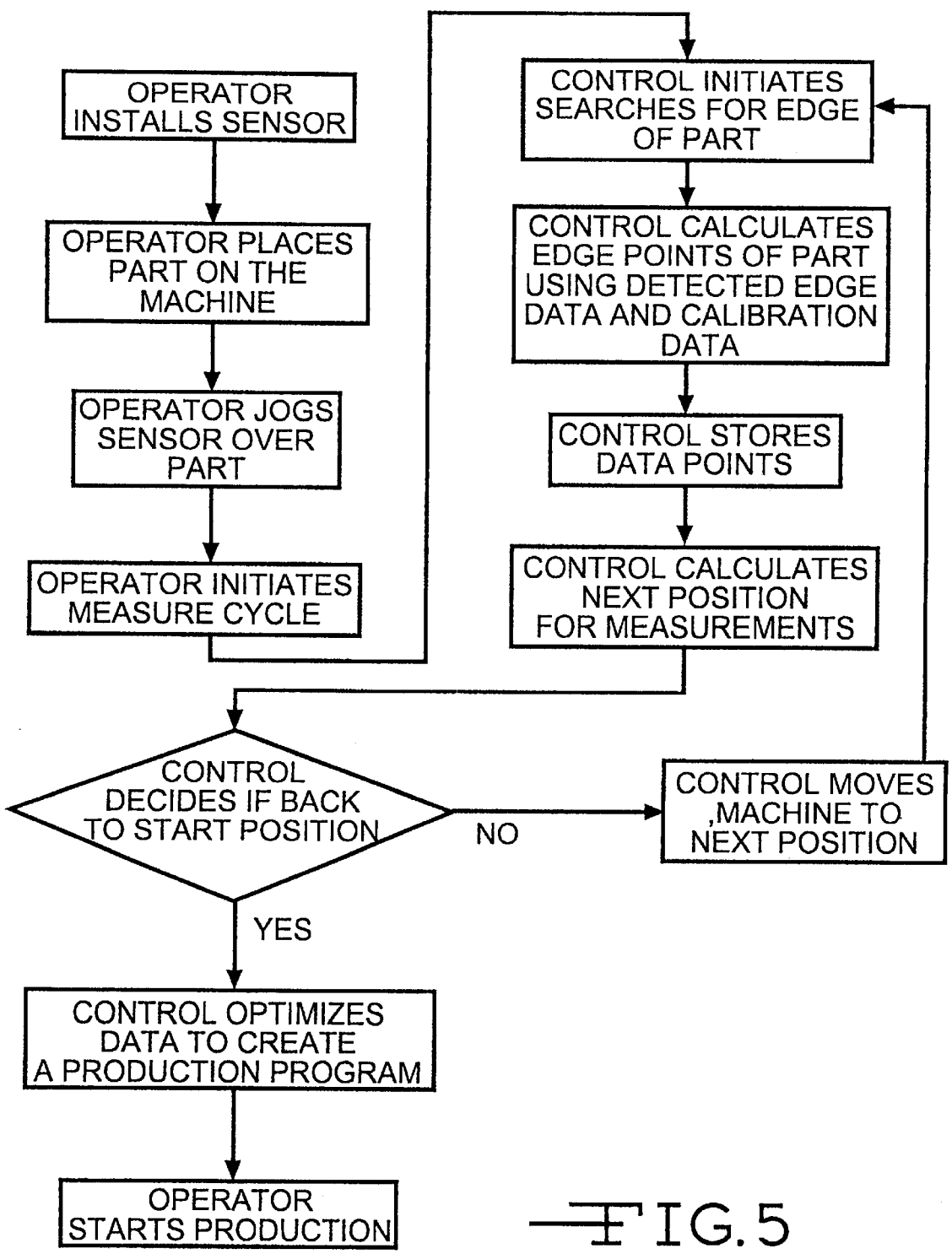
FIG. 5 is a logical flow chart illustrating the operation of the invention.
Figure 6:
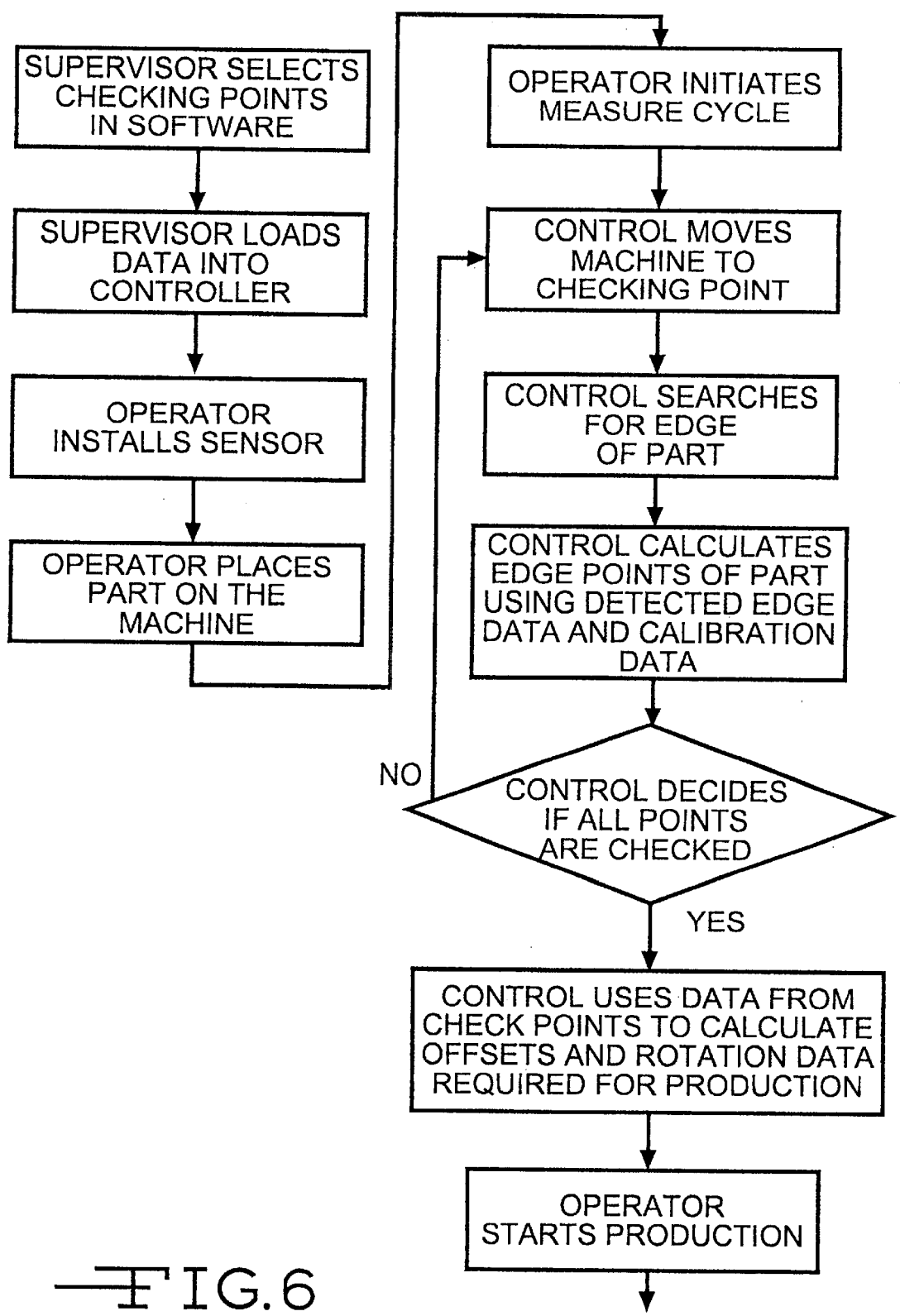
FIG. 6 is a logical flow chart illustrating the operation of the invention.

FIGS. 5 and 6 are logical flow charts illustrating the operation of the CNC machine and sensor. FIG. 5 is the part location process to establish edge points of blank S. FIG. 6 is the digiting system to create a production program for moving grinding wheel 34 around the perimeter of blank S. FIGS. 5 and 6 show the step of removing the sensor before starting production. In an alternative embodiment, the operator could enclose the sensor rather than remove it. These steps are needed merely to keep the sensor clean and to prevent damage. Particles from a tooling operation such as edge grinding could interfere with the sensor's operation.

While grinding illustrates the machining operation, the sensor controlled CNC machine can perform other operations such as cutting and deleting (removing paint or printing from a part).

CNC apparatus 10 also may, include a shuttle with a vacuum pick up unit mounted on linear motion ways. The pick is air cylinder actuated for raising and lowering. The function of the shuttle is to pick up parts from the cutting conveyor, break-out the excess trim of the part, and shuttle the parts to the grinding station. Break-out fingers are used to remove the excess glass around the part; once this operation has been completed the fingers retract to facilitate picking up the part. The lateral movement of the shuttle between the pick up station and the grinder load table is a fixed distance for all parts. Positive stops are provided to slow the cylinder at the end of each stroke and stop the pick up device in an exact location at either end of its travel. This assures positive location of the part in the system.

Edger 36 is a three axis, continuous path CNC edge grinder designed specifically to run auto glass or similar parts. The diamond wheel grinds 360° degrees; after the part is ground, the diamond wheel retracts and the belts raise up to shuttle the part out. Linear motion of the slides is controlled by an A.C. servo motor and a directly coupled, ball type lead screw. Lead screws on both the "X" and "Y" axes are mounted in pre-loaded, angular contact, high thrust type bearings to eliminate all end play. Mounted on the spindle-carriage assembly ("X" axis) is a precision grinding spindle directly coupled to a 5 H.P., A.C. drive motor. Also attached to the housing that holds the spindle is a vacuum type coolant guard assembly and rotating mechanism. This assembly consists of the necessary components, bearings, seals, gears and an A.C. servo motor to rotate the guard to keep its slotted opening tangent to the point of grind. The vacuum coolant guard also contains a coolant spray ring which directs coolant to the diamond wheel. When grinding, coolant is piped to this ring from an external supply. The rotating feature of this assembly comprises the third axis of the machine. The diamond wheel is mounted on a motorized, balanced, variable speed spindle.

As table 50 and blank S move towards stop 52', the endless motion of grinding wheel 36 circumscribes a portion of the periphery of the blank. As table 50 and the blank reverse direction, grinding wheel 36 continues on its path about the periphery of blank S. When table 50 stops a stop 52, the grinding path is complete The CNC electrical cabinet consists of all components necessary to control the compact system. In the main enclosure is housed the CNC controller, servo amplifiers, the program logic controller and the adjustable frequency A.C. motor drives and other components necessary for the manual and automatic operation of the compact system. The CNC controller used is a dual CNC continuous path control that controls the X, Y and Z (coolant guard rotation) axes.

The machine is equipped with a vacuum coolant guard and a mist collection system designed to keep coolant off the glass and the machine guards. The vacuum guard itself has a fixed rear section and an easily removable front half; coolant and air are pulled up through the top of the guard and up to the mist collector via flexible hose. Once the grinding cycle is completed, a belt section will raise to convey to glass to the next process. The PLC will control the non-motion functions of the CNC and the table. It will also interface with the line control panel to insure automatic sequencing of the line. In the doors of the panel will be push buttons and selector switches that allow manual and automatic control of the CNC grinder.

In a standard CNC glass grinding machine, an operator must adjust the CNC parameters to allow the CNC machine to grind the part where it is located on the machine. This can be a slow process and is difficult for many operators to master. The prior art process requires the operator to grind a part, check the part for even grind then adjust the X, Y and rotation offset parameters on the CNC control to move the CNC program to match the part location. This normally require many iterations at about 30 to 60 seconds per pass. Operators can easily make errors that may damage the machine or grinding tool and make the process take much longer. Also, operators may make imperfect adjustments during set up causing excess tool wear, lower throughput and lower yields.

By using a sensor such as a laser and programming check points in the CNC program, the operation can be automated. The CNC machine can then automatically go to the check points and measure the part location. Once the locations are measured, the CNC control can calculate the necessary X, Y and rotation offset parameters. This removes the chance for operator error, increases the accuracy of part position compensation, finds the parameters in one pass and does not waste glass for set up.

I claim:

1. An apparatus for use in machining a workpiece comprising, in combination:

a workpiece holder for receiving and mounting a workpiece in a fixed position, with the workpiece holder being movable in at least one direction along X, Y or Z axes;

a tool assembly having at least one tool for machining the workpiece, the tool assembly being movable in at least one direction corresponding to X,Y or Z axes;

a controller operatively connected with the workpiece holder and the tool assembly, the controller being programmable to cause relative movement of the workpiece holder and tool assembly along such axes to effect machining of the workpiece; and a sensor in engagement with the controller for scanning the workpiece to map its periphery and sending signals to the controller relating the workpiece position and orientation along such axes, wherein the controller initiates machining of the workpiece in accordance with the signals received from the sensor.

2. An apparatus for use in machining a workpiece comprising, in combination:

a workpiece holder for receiving and mounting a workpiece in a fixed position, the workpiece holder being movable in at least one direction along X, Y or Z axes;

a tool assembly having at least one tool for machining the workpiece, the tool assembly being movable in at least one direction corresponding X, Y or Z axes;

a controller operatively connected with the workpiece holder and the tool assembly, the controller being programmable to cause relative movement of the workpiece holder and tool assembly along such axes to effect machining of the workpiece; and a sensor in engagement with the controller for scanning the workpiece and sending signals to the controller relating the workpiece position and orientation along such axes, wherein the controller initiates the positional scan of the workpiece by orienting the sensor over the workpiece such that the sensor locates the edge of the workpiece to map the periphery of the workpiece, the sensor continually signals the controller data relating the positional orientation of the workpiece and the controller then creates relative movement between the workpiece holder and tool assembly to move the at least one tool and the workpiece holder in cooperation to machine the workpiece.

3. The apparatus of claim 2 wherein subsequent workpieces are positioned on the workpiece holder and the controller initiates relative movement between the tool assembly and workpiece holder in accordance with the data relating the positional orientation of the first workpiece to accurately machine each subsequent workpiece.

4. The apparatus of claim 2 wherein subsequent workpieces are mounted on the workpiece holder and the controller initiates a positional scan of each subsequent workpiece by moving the sensor about the edge of the workpiece to map the periphery of the workpiece and signal the controller with data relating the positional orientation of the workpiece and wherein the controller calculates offset parameters by comparing the positional data of the subsequent workpieces with the positional data of the initial workpiece and applies the offset parameters to create relative movement between the tool assembly and workpiece holder to accurately machine each subsequent workpiece.

5. The apparatus of claim 2 wherein the sensor is a reflective sensor.

6. The apparatus of claim 2 wherein the sensor is a laser.

7. The apparatus of claim 2 wherein the sensor includes a quick disconnect coupling to fix the sensor to the tool assembly.

* * * * *